United States Patent [19]

McCourt et al.

[11] Patent Number: 4,718,210

[45] Date of Patent: Jan. 12, 1988

[54] FASTENER FOR VOID-FORMING MEMBER

[76] Inventors: James P. McCourt, 10201 Bond, Overland Park, Kans. 66214; Cecil L. Foley, Jr., 604 Mission Creek Dr., Edwardsville, Kans. 66113; Danny L. Shuler, 7807 Bel Ray Dr., Belton, Mo. 64012; Robert J. Shuler, 10810 Bennington, Kansas City, Mo. 64134

[21] Appl. No.: 883,113

[22] Filed: Jul. 8, 1986

[51] Int. Cl.[4] .................. E04C 1/00

[52] U.S. Cl. .................. 52/309.12; 52/378; 52/405; 411/456; 411/457; 411/508; 249/207

[58] Field of Search .................. 44/451, 456, 457, 458, 44/459, 460, 508; 52/127.5, 309.12, 378, 379, 405; 249/205, 207

[56] References Cited

U.S. PATENT DOCUMENTS

| | | | |
|---|---|---|---|
| 464,961 | 12/1891 | Dickinson | 411/458 |
| 607,670 | 7/1898 | Van Uliet et al. | 411/456 |
| 638,386 | 12/1899 | Farrow | 411/458 |
| 1,621,213 | 3/1927 | Olson | 411/457 |
| 1,853,754 | 4/1932 | Wagner | 411/460 |
| 2,620,705 | 12/1952 | Poduinecz et al. | 411/460 |
| 2,927,497 | 3/1960 | Rapata | 411/508 |
| 2,966,705 | 1/1961 | Massey | 411/460 X |
| 3,693,496 | 9/1972 | Koide | 411/458 |
| 3,722,130 | 3/1973 | Handl | 411/460 X |
| 4,427,328 | 1/1984 | Kojima | 411/508 |

FOREIGN PATENT DOCUMENTS

| | | | |
|---|---|---|---|
| 457443 | 6/1949 | Canada | 411/456 |
| 27588 | 4/1921 | Denmark | 411/457 |
| 1340479 | 9/1963 | France | 411/457 |
| 126892 | 5/1919 | United Kingdom | 411/457 |
| 766464 | 1/1957 | United Kingdom | 411/457 |
| 1428117 | 3/1976 | United Kingdom | 52/309.12 |

*Primary Examiner*—Kenneth J. Dorner
*Assistant Examiner*—Rodney M. Lindsey
*Attorney, Agent, or Firm*—D. A. N. Chase

[57] ABSTRACT

A fastener is disclosed for affixing void-forming members to underlying concrete slabs for use in composite slab construction. Each fastener comprises a stem having a cross limb with a barbed end for insertion into a foam member, a stabilizer bar transversely projecting from one side of the stem intermediate its ends, and bottom barbs. Upon insertion of the barbs of the cross limb into a foam member and projection of the bottom barbs of the stem into a concrete slab, the foam member is thus secured thereto. Several fasteners spaced around the periphery of the member are employed. The concrete slab with void-forming members installed is then overlaid with a poured concrete cap, thereby forming a unitary composite construction.

6 Claims, 6 Drawing Figures

FASTENER FOR VOID-FORMING MEMBER

BACKGROUND OF THE INVENTION

This invention relates to composite slab construction, and more particularly, to fasteners used therein for securing void-forming members to concrete slabs during the construction process.

It has been found that in certain building applications, where the engineer or architect specifies that the load-bearing requirements will justify such substitution, expanded polystyrene (foam) can be used as an inner layer or core (void) between layers of concrete thereby reducing the weight and construction costs inherent in solid slab construction. In this technique, known in the industry as composite slab construction, typically an inner core of expanded polystyrene is secured to a bottom layer of concrete and then additional concrete is poured over the composite structure.

In the past, each of the fasteners used to initially secure the polystyrene to the bottom concrete layer or slab has consisted of a single, upright stem with a plurality of barbs on each end and an intermediate brace. The upper barbed end is inserted into a polystyrene member to the level of the intermediate brace, and the lower barbed end is received in the underlying concrete slab. A number of such voids would be laid in a desired pattern over the concrete slab, several fasteners being employed with each void-forming member. These void members are laid with varying spaces between them according to the specifications for the building, and after they are in place concrete is then poured into a framework to encompass both the underlying concrete and voids to complete the composite slab construction.

The prior fasteners have the disadvantage of shifting within their anchor holes in the void members and thereby enlarging their receiving holes to permit the polystyrene to move, shift or pull away, particularly when it was necessary for a worker to walk on the voids during the construction process. This then would necessitate a continuous readjustment and shifting of the voids in an attempt to realign their placement before the final concrete filler was poured.

In response thereto, the fastener of the present invention effectively secures the polystyrene voids tightly to the underlying concrete slab so that shifting or misalignment during the composite slab construction process will not occur. If a fastener is not tightly engaged within the polystyrene void, as was the tendency with the prior art fasteners, the fastener could be removed without significant damage to the foam, thereby indicating that the grip of the fastener was insufficient to hold the void on the concrete slab.

It is therefore, the primary object of this invention to provide a fastener for concrete void work that does not have the disadvantages heretofore recited and which is capable of effectively securing a void-forming member to a concrete slab so that external forces on the member will not enlarge the anchor hole in the foam and thereby shift the position of the member.

It is a further object of this invention to provide a fastener in which a laterally projecting arm is provided that is inserted into a void-forming member in conjunction with an upright stem embedded in a concrete slab to thereby hold the void member in place.

A more particular object of this invention is to provide a fastener, as aforesaid, having a pluralitiy of barbs on its stem for insertion into a concrete slab, with an additional plurality of barbs on its horizontal arm for securing a void-forming member from a side position so that it is immovably secured to the underlying concrete slab.

Another object of this invention is to provide a fastener, as aforesaid, which can be inserted into a foam member before the member is used in a construction project, so that foam members can be readied for use during slack periods of time without being dependent upon the exigencies of a particular job.

Yet another object of this invention is to provide a fastener, as aforesaid, which can be pre-inserted into a foam member before that member is needed on a job, thereby making it possible to lay the voids of the composite slab construction at a faster pace than was possible with prior art fasteners, which were inserted as the voids were being laid thereby requiring additional on-the-job time. The pre-fastened foam members are also readily stacked and stored, which was not possible with the prior art fasteners because they protruded from the bottom of the foam members rather than from the side as in the subject invention.

DESCRIPTION OF THE PREFERRED EMBODIMENT

Figure 2:
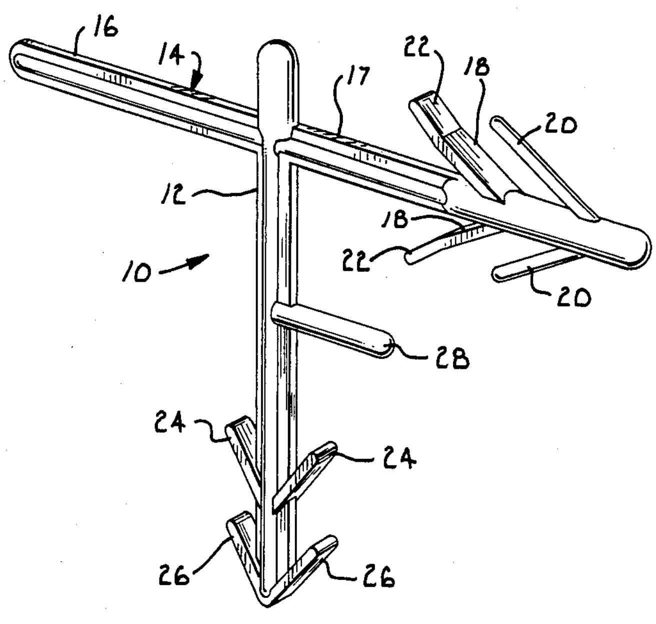
FIG. 2 is a perspective view of one of the fasteners of the present invention.
Figure 3:
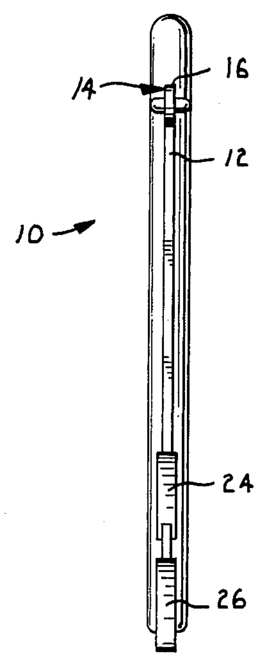
FIG. 3 is a side elevation of the fastener of FIG. 2 as seen from the left side of FIG. 2.
Figure 4:
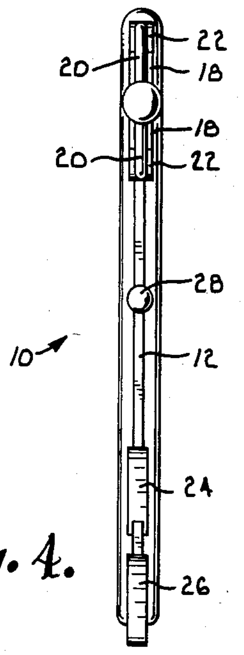
FIG. 4 is a side elevation as seen from the right side of FIG. 2.
Figure 5:
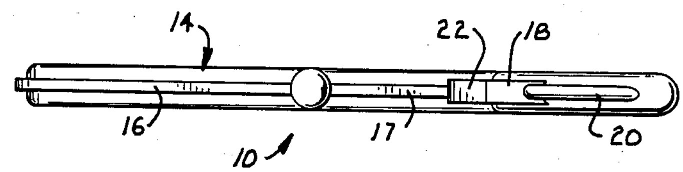
FIG. 5 is a top plan view of the fastener of FIGS. 2–4.
Figure 6:
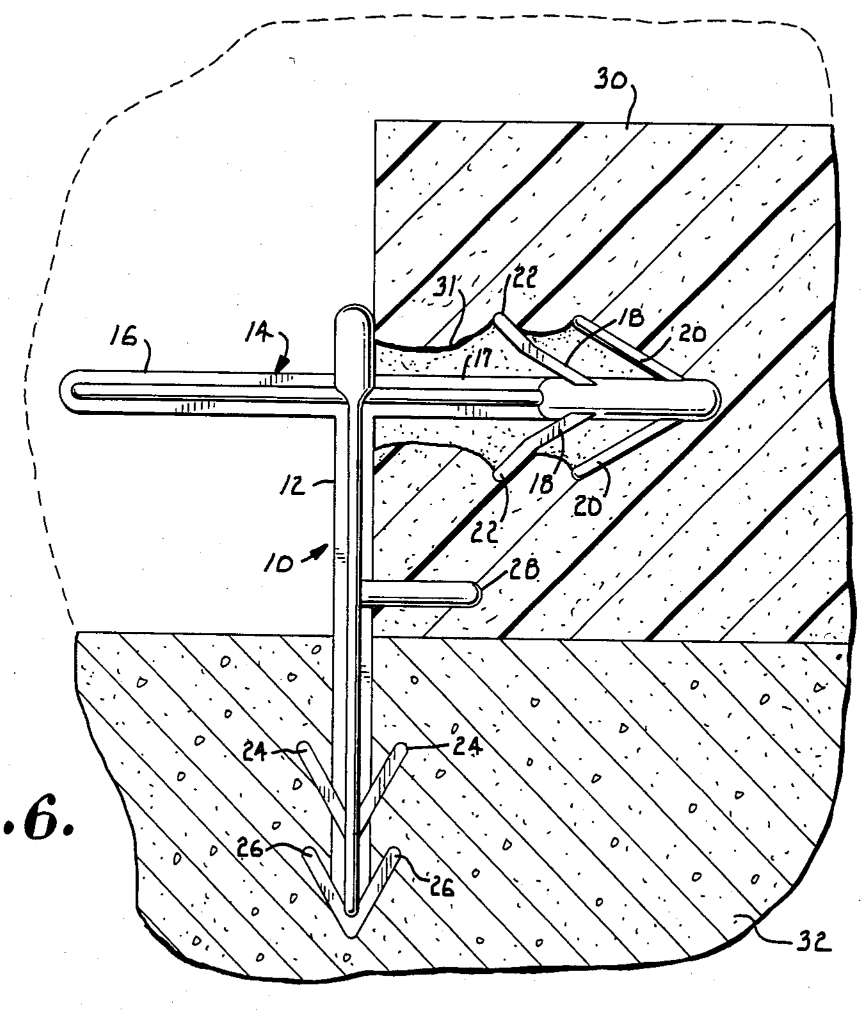
FIG. 6 is a view similar to FIG. 2 but showing the fastener in front elevation with the bottom and lateral barbs embedded in a concrete slab and a foam member respectively, and shows the interior deformation of the foam material caused by insertion of the lateral barbs.

Referring to the drawings, FIG. 2 shows the void fastener 10, preferably of unitary, molded plastic construction, as comprising an upright stem 12 having a cross limb 14 adjacent its upper end. The cross limb 14 includes an arm 16 rigid with the stem 12 and extending transversely of such stem 12 leftwardly as viewed in FIG. 2 to form a handle by which the fastener 10 may be held for use. An opposing arm 17 forming part of the cross limb 14 extends rigidly and transversely from the stem 12 in the opposite direction and is provided with a plurality of barb means 18 and 20 for insertion into a void-forming expanded polystyrene member 30 (FIG. 6). The inner barb means 18 consists of two barbs which project rearwardly from the tip portion of arm 17 and flare outwardly at their distal ends 22 for extra gripping within the hole 31 formed in the member 30.

The upright stem 12 has a plurality of barb means 24 and 26 at the bottom of the stem, such as are shown in FIG. 2, for securing the stem 12 within a slab of material 32, such as concrete (FIG. 6), into which the stem 12 is inserted.

Additionally, as shown in FIG. 6, the fastener 10 utilizes a stabilizer bar 28 which projects transversely from one side of the stem 12 intermediate the bottom barb means 24 and 26 and the cross limb 14. This stabilizer bar 28 adds strength to the fastener 10 and inhibits horizontal movement of the fastener stem 12 or the cross limb 14 relative to the void-forming member 30.

In use, as shown in FIG. 6, the handle or arm 16 is used as a holder by a worker who then uses manual force to project the other arm 17 into the void-forming member 30 with the stabilizer bar 28 also inserted in the member 30 near its bottom, as viewed in FIG. 6. This stabilizer bar 28, being parallel to the arm 17, cooperates with the barbs 20 and 22 of arm 17 to prevent movement of the fastener 10 within the hole or cavity 31 formed as the barbs 20 and 22 are forced into the foam material. Depending upon the size of the void-forming members 30 to be used in a job, the fasteners 10 are inserted at varying distances around the sides of each member 30, such as is demonstrated in FIG. 1, and are thus rigidly held when the concrete base 32 to which the void-forming members 30 are to be secured has partially cured.

Figure 1:
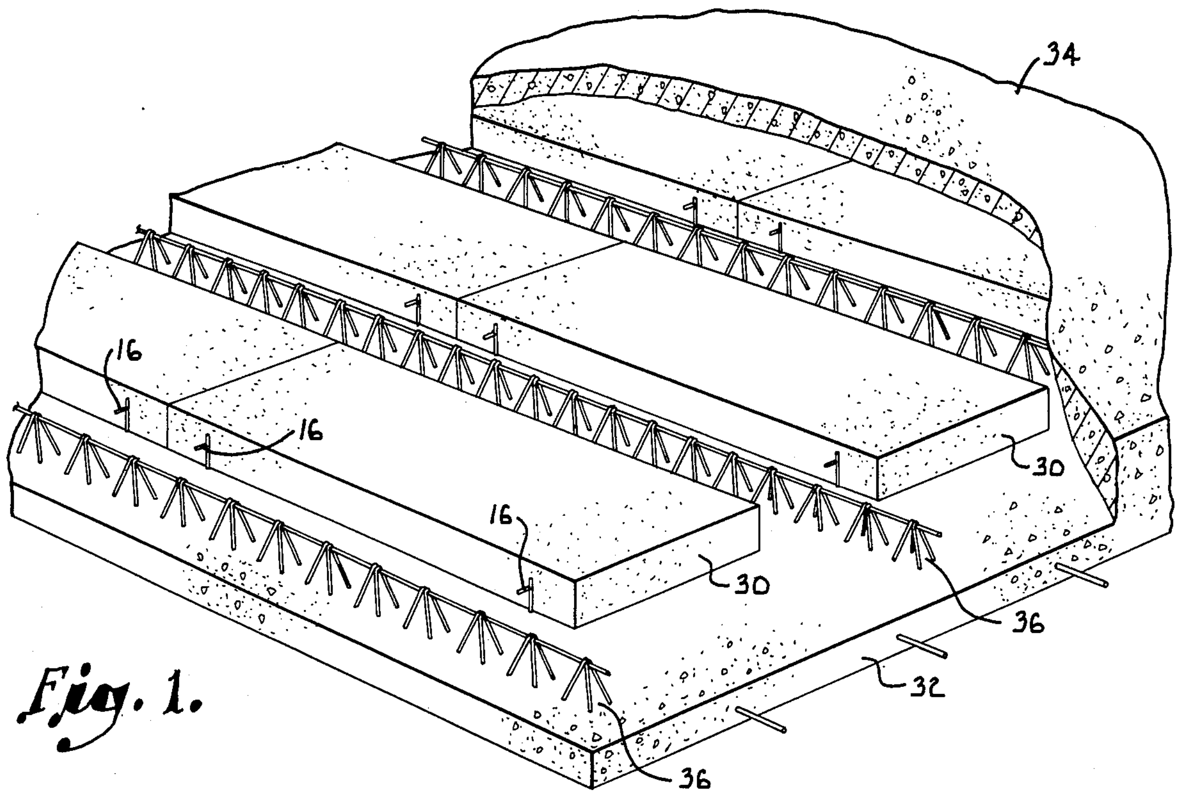
FIG. 1 is a fragmentary, perspective view of a concrete slab structure employing void-forming members held in place by the fasteners of the present invention, with a portion of the concrete cap away to reveal details of construction.

The fasteners 10 may be pre-inserted in the members 30 and the latter then transported to the casting facility, whereupon the barb means 24 and 26 on the stems 12 are then inserted into the concrete base 32 as shown in FIG. 1. The concrete base 32 becomes the bottom of a composite slab construction, the void-forming members 30 being the filler and a concrete cap 34 blanketing the bottom layer and its filler as shown in FIG. 1, thereby completing the composite construction.

The upright stems 12 of the fasteners 10 are of varying lengths depending upon the requirements of a job and may adapt to various thicknesses of void-forming members 30.

FIG. 1 illustrates the fasteners 10 in position along several void-forming members 30 which are then secured by the barb means 24 and 26 shown in FIG. 2 to the concrete slab 32. The handles 16 are shown in FIG. 1 protruding from the void-forming members 30. The composite slab construction is disclosed by the cutaway of FIG. 1 from which it can be seen that this type of construction incorporates rebar 36 or other structural reinforcement together with the void-forming members 30. This entire construction is overlaid and encompassed by a concrete cap 34 as previously discussed.

Experimentation has shown that the fastener 10 of this invention secures the void-forming member 30 tightly to the underlying concrete slab 32, so that it is not usually possible to pull the fastener 10 out of the member 30 without pulling away a very sizable chunk of the foam material 30. This is because the fastener 10 secures the member 30 so tightly that the foam from which it is made will normally yield before the fastener 10 will pull out of its hole 31 in the member 30.

An additional advantage of the present invention is that the members 30 can be pre-fitted with the fasteners 10 as discussed above, stacked for storage and then transported to the casting facility in multiples as needed.

Having thus described the invention, what is claimed as new and desired to be secured by Letters Patent is:

1. In a composite slab structure having a base of concrete material or the like and a void-forming foam member on a surface of said base, said member presenting peripheral sides generally perpendicular to said surface, a plurality of fasteners spaced around said periphery and each comprising:

a stem proximal to one of said peripheral sides of said member and partially inserted into said base through said surface thereof before said material has cured, and provided with barb means extending from the stem within said base, whereby a portion of said stem projects from said surface adjacent said side of the member, an arm spaced from said surface, rigid with said said stem and extending from said portion thereof transversely of the stem into said member through a surface of said one peripheral side, and provided with barb means projecting from the arm within said member to secure the arm thereto, and a stabilizing projection on said portion of the stem spaced from said arm and extending into said member through said surface of said one peripheral side, whereby the fasteners secure the member tightly to the base to preclude relative movement thereof during forming of the composite structure.

2. The structure as claimed in claim 1, wherein said stabilizing projection of each fastener is disposed between said arm thereof and said surface of said base.

3. The structure as claimed in claim 1, wherein said stabilizing projection comprises a bar rigid with said stem and extending transversely therefrom.

4. The structure as claimed in claim 3 each fastener further comprising a cross limb on said portion of the stem rigid thereto, said cross limb presenting said arm and including an opposing arm defining a handle for the fastener.

5. The structure as claimed in claim 2, wherein said stem, cross limb and stabilizer bar of each fastener lie in a common major plane.

6. The structure as claimed in claim 5, wherein said cross limb and stabilizer bar extend in parallelism.

* * * * *